J. G. WOLFE.
SHOE FOR PNEUMATIC TIRES.
APPLICATION FILED OCT. 17, 1919.
1,362,979.
Patented Dec. 21, 1920.
3 SHEETS—SHEET 1.
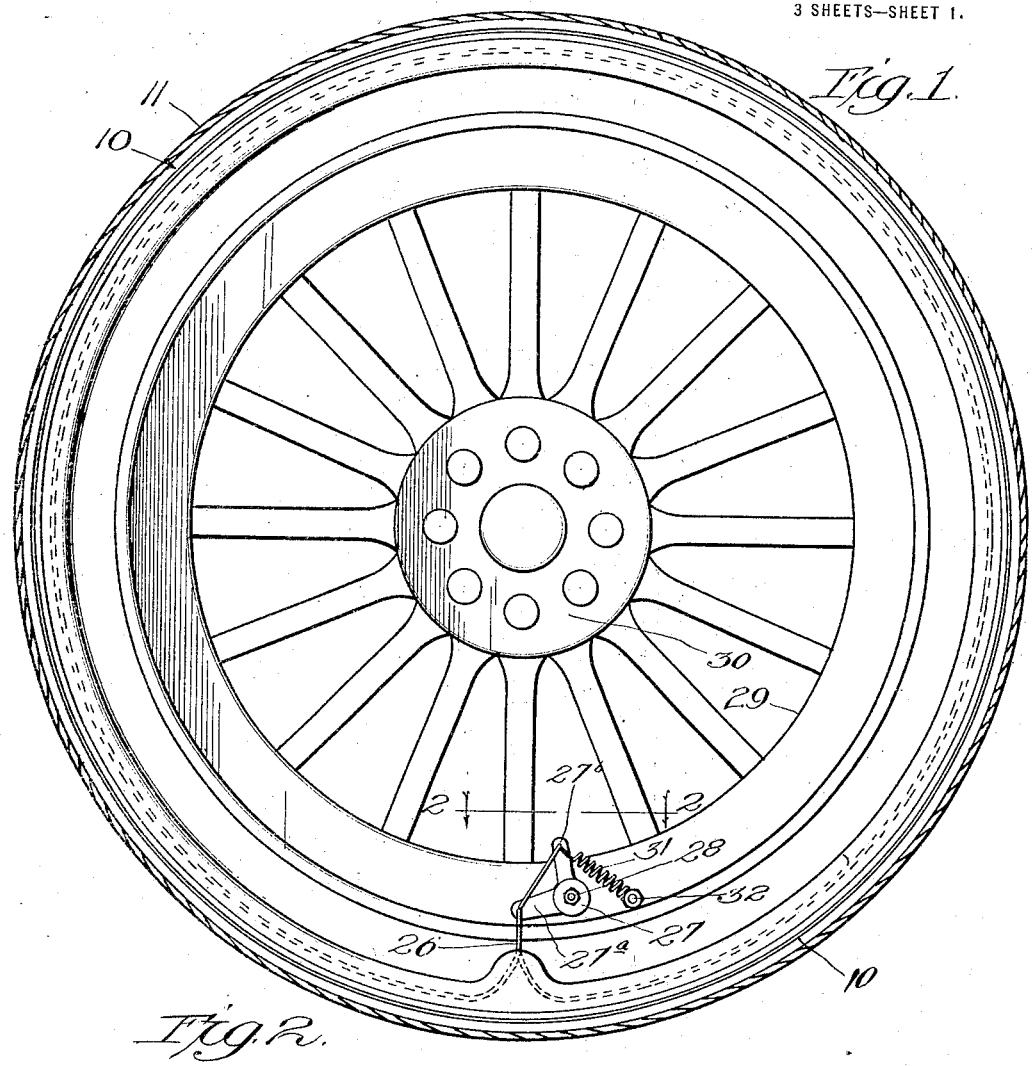
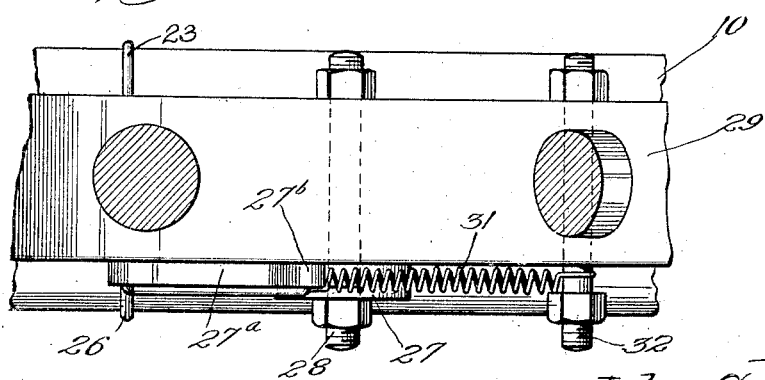
Inventor
John G. Wolfe

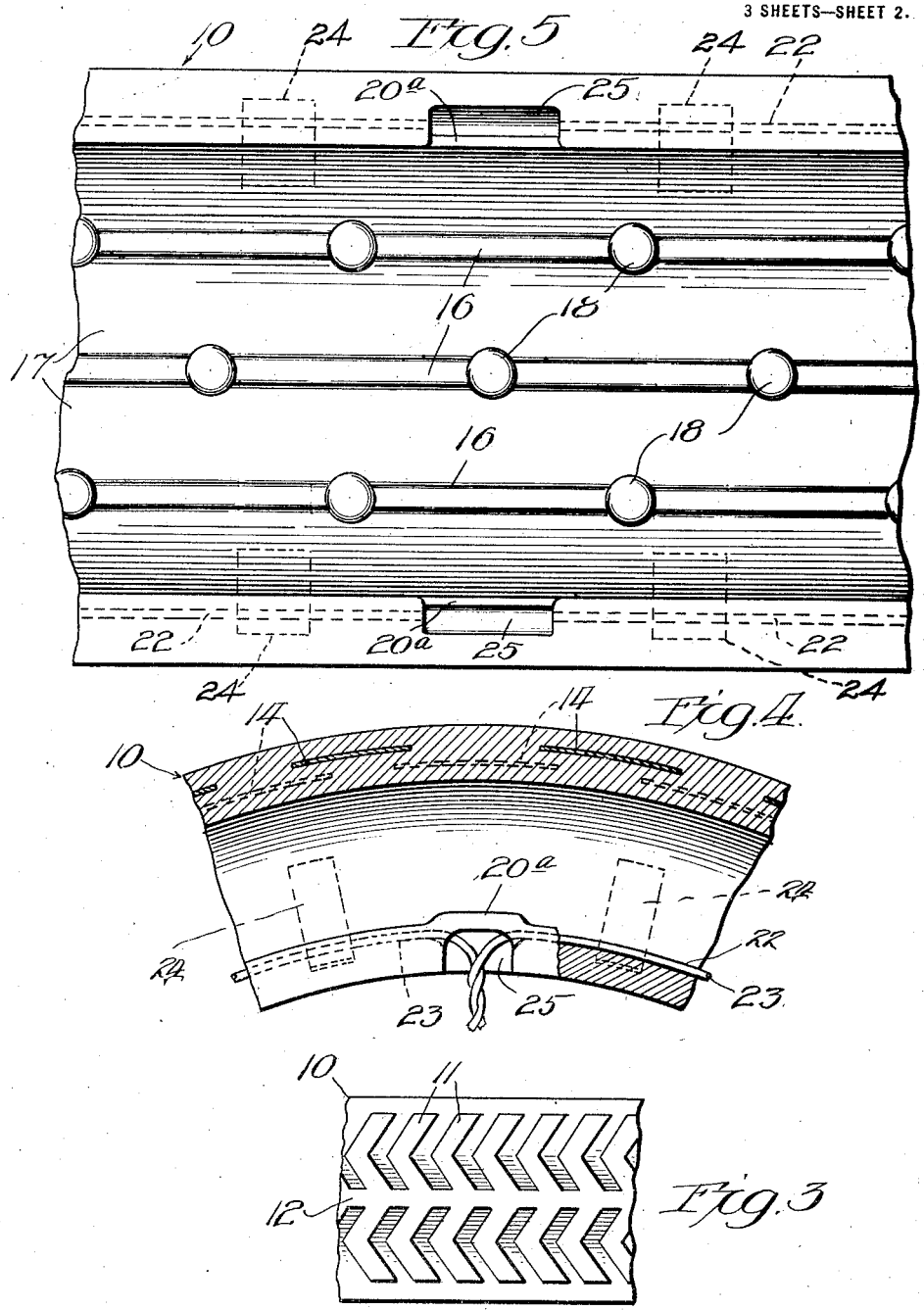

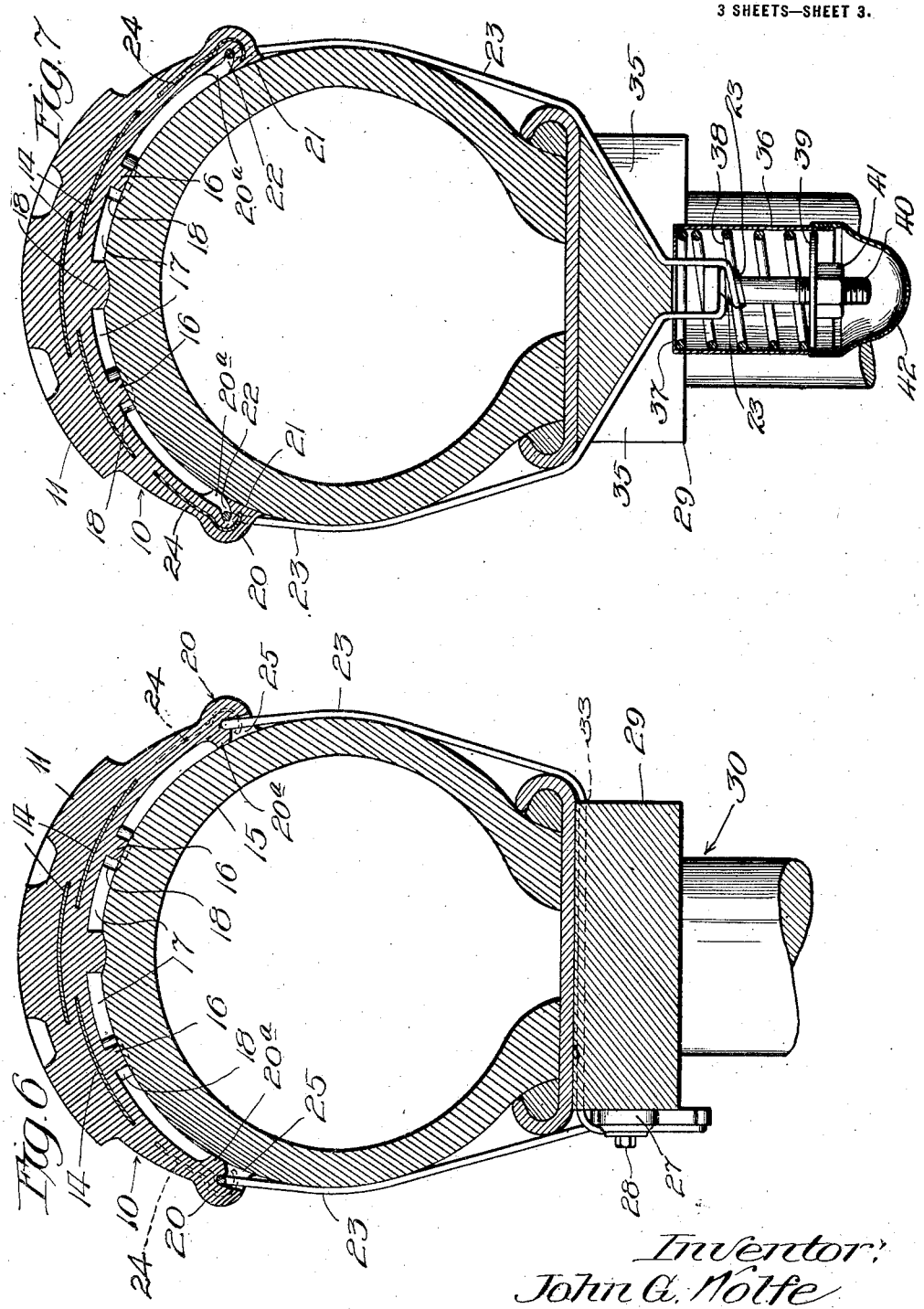

UNITED STATES PATENT OFFICE.

JOHN G. WOLFE, OF CHICAGO, ILLINOIS.

SHOE FOR PNEUMATIC TIRES.

1,362,979. Specification of Letters Patent. Patented Dec. 21, 1920.

Application filed October 17, 1919. Serial No. 331,347.

*To all whom it may concern:*

Be it known that I, JOHN G. WOLFE, a citizen of the United States, residing at Chicago, in the county of Cook and State of Illinois, have invented certain new and useful Improvements in Shoes for Pneumatic Tires, of which the following is a specification.

This invention relates to shoes for pneumatic tires and its purpose is to provide an auxiliary tread which may be detachably secured to any tire in order to increase the life thereof by reducing the wear on the tread surface.

The principal object of the invention is to provide a detachable puncture proof shoe for pneumatic tires. A further important object is to provide improved means for securing the shoe to the tire so that a tight and uniform contact is maintained between the shoe and tire throughout the periphery of the wheel. Another object is to provide means for preventing the creeping of the shoe around the periphery of the tire. Still another object is to provide means for overcoming the effect of sand and the like which may tend to enter the space between the shoe and the tire. Other objects relate to various other forms of construction and arrangement which will be set out more fully hereinafter.

The nature of the invention will be understood from the following specification taken with the accompanying drawings in which certain embodiments are illustrated.

In the drawings—

Figure 1 shows a side elevation of an automobile wheel and pneumatic tire having my improved shoe applied thereto;

Fig. 2 shows an enlarged section on the line 2—2 of Fig. 1, illustrating the means for maintaining tension in the lateral edges of the shoe;

Fig. 3 shows a partial plan view of the outer surface of the shoe, illustrating the means for forming a non-skid surface on the shoe;

Fig. 4 shows a vertical section through the shoe with a part of the lateral edge of the shoe broken away at the point where the flexible fastening members are drawn out;

Fig. 5 shows an enlarged plan view of the inner side of the shoe, illustrating the longitudinal ribs by which air spaces are formed between the shoe and the tire;

Fig. 6 is a lateral section through the tire and shoe showing the means for adjusting the tension of the fastening members in the lateral edges of the shoe; and Fig. 7 shows a sectional view similar to Fig. 6, illustrating a modified form of the means for adjusting the tension of the fastening member.

The invention comprises an endless circular shoe 10 which may be formed of rubber and woven or cord fabric or other reinforcing material. This shoe is adapted to conform to the contour of the periphery of the tire as illustrated particularly in Figs. 6 and 7. The outer surface of the shoe is provided with a series of non-skid projections 11 which are formed by molding a series of letters W on the outer surface of the tread with the central parts of the letters united, as shown at 12 to form a peripheral rib. The shoe is made puncture proof by a plurality of metal plates 14 which are embedded in the shoe and arranged to overlap each other as shown in Figs. 4, 6, and 7 so that a nail or other object entering the shoe will encounter one of these sheets of metal throughout the periphery of the shoe and throughout the major portion of its lateral width. This arrangement of the metal plates does not interfere with the flexibility of the shoe nor of the tire 15 to which it is attached.

The inner side of the shoe is provided with a plurality of radially projecting ribs 16 which extend throughout the periphery of the shoe and which are adapted to seat upon the outer surface of the tire. The ribs 16 are spaced apart transversely of the shoe to form intermediate air spaces 17 which are adapted to receive any sand which may tend to enter the space between the shoe and the tire. The small amount of sand which enters this space will collect in the air spaces 17 and may be cleaned out at intervals by detaching the shoe in the manner hereinafter described. These air spaces also increase the flexibility of the shoe and the intermediate ribs provide sufficient stiffness to maintain the desired curvature of the outer surface of the shoe. The ribs 16 are enlarged at intervals to form circular beads or projections 18 which project inwardly beyond the inner surfaces of the ribs 16 and are adapted to become indented in the outer surface of the tire 15 when the shoe is applied to the tire. The beads 18 thus grip the tire and prevent the creeping of the shoe around the tire when it is in use. If desired, the ribs and air spaces on the inner surface of the shoe may be eliminated.

The shoe is provided along its lateral edges with enlarged beads or ribs 20 which terminate in inwardly projecting parts having flat surfaces 21 adapted to seat upon the surface of the tire and to form a tight contact with the tire throughout the circumference of the shoe. Each bead 20 is provided on its inner side with circular groves or depressions 22 which are adapted to receive flexible fastening members 23 formed of wire or other suitable material. These wires extend throughout the circumference of the shoe and tension is preferably maintained therein in order to secure a tight contact between the surfaces 21 and the outer surface of the tire. The lateral edges of the shoe are reinforced by means of metallic hook members 24 which are embedded in the shoe and provided with curved parts which are adapted to extend around the grooves 22 so that considerable stiffness is imparted to the beads 20 and the outward bending of the outer edges of the shoe is prevented when a strain is placed upon the fastening members 23.

At some point around the periphery of the tire 15, the fastening members 23 are withdrawn through outlet openings 25 which extend through the beads 20 on the lateral edges of the shoe thereby leaving a partial bead 20$^a$ adjacent each opening 25, this small rib 20$^a$ being adapted to coact with the surface of the tire and thus reduce the amount of dust or sand which may enter through the opening. If desired, a flap 25$^a$ may be formed on the edge of the shoe to extend inwardly opposite the opening 25, as shown in Fig. 1. The free ends of the flexible members 23 may be united by twisting them together or other suitable means such as welding as indicated in Fig. 4, but it is usually desirable to use some fastening means which will maintain tension in the flexible members. One form of such a fastening means is illustrated in Figs. 1, 2, and 6 where the fastening members are extended radially inward on opposite sides of the tire and are attached to a tensioning device carried by the rim 29 of the wheel 30. This device comprises a bell crank lever 27 which is pivotally mounted on a stud 28 projecting from the inner side of the wheel so that the fastening device is ordinarily concealed from view. A flexible member 26 is connected to the flexible members 23 and this member 26 is connected to one arm 27$^a$ of the lever. Another arm 27$^b$ of the lever is connected at one end to a coil spring 31 and this spring is secured to the rim 29 by means of a stud 32. The spring tends to move the lever about its pivot and thus maintain tension in the flexible members 26. Instead of mounting a lever 27 on each side of the rim, the flexible members 23 on one side of the tire are preferably extended through a transverse aperture 33 in the rim 29 and are connected with the lever 27 at the other side of the tire. If desired, two flexible fastening members may be inserted in each groove and the ends of these members may be fastened at points located on opposite sides of the center of the wheel, this construction being especially desirable when no means is employed for maintaining tension in the flexible members.

Instead of using the construction illustrated in Figs. 1 and 6, the flexible members 23 may be extended inwardly and through apertures 35 which are formed in the rim 29. These apertures lead inwardly between the spokes and are adapted to communicate with a cylindrical member 36 which is secured in a seat 37 formed in the rim. The coil spring 38 is mounted in the casing 36 and the inner end of the spring engages a washer 39 which is secured on the treaded stem 40 by means of a nut 41. The inner end of the stem or bolt 40 is connected to the flexible member 43 and by adjusting the bolt 41, it is possible to maintain any desired tension in the fastening members through the operation of the spring 38. The inner end of the cylindrical casing 36 is closed by a removable cap member 42.

This invention provides a puncture proof device which may be readily attached to any automobile tire for the purpose of preventing punctures or for increasing the life of the tire. The novel construction herein described makes it possible to maintain the tight contact between the shoe and the tire and to prevent relative movement of the shoe and the tire when the device is in use. Although the invention has herein been illustrated in connection with pneumatic tires, it will be obvious that the embodiment may be applied to solid tires in order to increase the life thereof. The beads along the lateral edges of the shoe will prevent the wearing of the sides of the tire on curb stones and the like, thus reinforcing the tire at the point where blowouts most frequently occur.

Although I have shown and described certain forms of the invention for purposes of illustration, it will be understood that it may be constructed in various other ways without departing from the scope of the appended claims.

I claim:

1. The combination with a tire of a continuous annular rubber shoe adapted to engage the outer annular surface of the said tire, each edge of said shoe being provided with a continuous annular groove opening inwardly toward the tire on the inner side of said shoe, and continuous metallic binding members each adapted to engage one of said grooves and to be inserted in and withdrawn bodily therefrom, said binding members being capable of circumferential movement in said grooves.

2. The combination with a tire of a continuous annular rubber shoe adapted to engage the outer annular surface of the said tire, each edge of said shoe being provided with a continuous annular groove opening inwardly toward the tire on the inner side of said shoe, continuous metallic binding members each adapted to engage one of said grooves and to be inserted in and withdrawn bodily therefrom, and metallic reinforcing members embedded in said shoe along its lateral edges and extending around said grooves.

3. The combination with a tire of a continuous annular rubber shoe adapted to engage the outer annular surface of the said tire, each edge of said shoe being provided with a continuous annular groove opening inwardly on the inner side of said shoe, continuous metallic binding members each adapted to engage one of said grooves and to be inserted in and withdrawn bodily therefrom, and hook shaped metallic binding members extending transversely of said shoe and around said grooves along its latteral edges, said hook members being embedded in the rubber of said shoe.

4. The combination with a pneumatic tire of an annular shoe adapted to engage the outer surface of the tire, said shoe being provided with inwardly extending annular ribs adapted to seat upon the tire, means engaging the lateral edges of the shoe for securing it to the tire, and lugs extending inwardly from said ribs to project into indentations formed by them in the tire and thereby prevent relative rotation of the tire and shoe.

5. The combination with a pneumatic tire of an annular shoe adapted to engage the outer surface of the tire, said shoe being provided with inwardly extending annular ribs adapted to seat upon the tire, means engaging the lateral edges of the shoe for securing it to the tire, and lugs extending inwardly from said ribs to project into the tire and thereby prevent relative rotation of the tire and shoe, said lugs being staggered.

6. The combination with a pneumatic tire of an annular rubber shoe adapted to extend around the peripheral tread surface of said tire, said shoe being provided with annular ribs on its inner side to coact with the tread surface of said tire, lugs formed on the inner surfaces of said ribs to project into indentations in the tread surfaces of said tire formed by said lugs when said shoe is applied to said tire, said shoe being provided with other annular ribs along its lateral edges extending inwardly and adapted to grip the lateral edges of said tire, said last-named ribs being provided with annular inwardly opening grooves extending throughout the circumference of said shoe, and metallic annular binding members detachably engaging said annular grooves.

7. The combination with a tire of an annular shoe adapted to extend around the peripheral surface of the tire, said shoe being provided with annular grooves on the inner sides of its lateral edges, flexible members seated in said annular grooves, and means for maintaining tension in said flexible members to secure a tight contact between said shoe and said tire.

8. The combination with a pneumatic tire of a felly upon which said tire is mounted, an annular shoe adapted to seat upon the peripheral surface of said tire, said shoe being provided with annular recesses in its lateral edges, flexible members seated in said recesses, and means for securing said flexible members to said felly.

9. The combination with a pneumatic tire of a felly upon which said tire is mounted, an annular shoe adapted to seat upon the peripheral surface of said tire, said shoe being provided with annular recesses in its lateral edges, flexible members seated in said recesses, a movable member mounted on said felly and connected to said flexible members, and a spring engaging said movable member to maintain tension in said flexible members.

10. In combination with a tire of a continuous annular rubber shoe adapted to engage the outer annular surface of the tire, the lateral edges of said shoe each being provided with continuous annular recesses extending throughout the circumference of the shoe, continuous metallic binding members each loosely engaging one of said recesses and extending throughout the circumference of the shoe, and metallic hook members embedded in the rubber of said shoe along its lateral edges with the hook portions thereof extending partially around said recesses and with the stems thereof extending transversely of the shoe.

In testimony whereof I have subscribed my name.

JOHN G. WOLFE.